Figure 1:
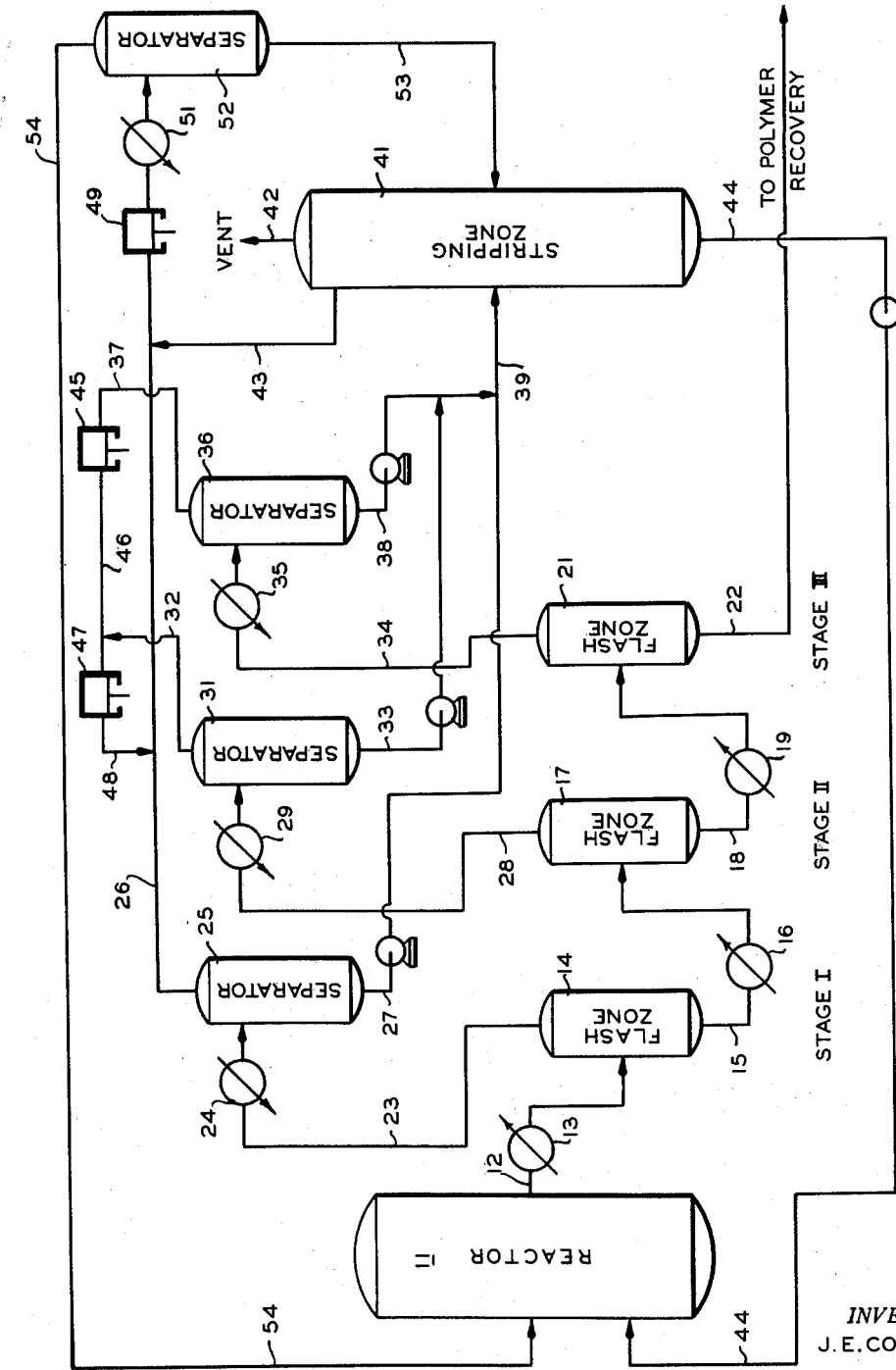

March 12, 1963 — J. E. COTTLE — 3,081,290
MONOMER RECOVERY PROCESS
Filed June 21, 1956 — 2 Sheets-Sheet 1

FIG. I.

INVENTOR.
J. E. COTTLE
ATTORNEYS

March 12, 1963 J. E. COTTLE 3,081,290
MONOMER RECOVERY PROCESS
Filed June 21, 1956 2 Sheets-Sheet 2

INVENTOR.
J. E. COTTLE
BY *Hudson & Young*
ATTORNEYS

United States Patent Office 3,081,290
Patented Mar. 12, 1963

3,081,290
MONOMER RECOVERY PROCESS
John E. Cottle, Bartlesville, Okla., assignor to Phillips Petroleum Company, a corporation of Delaware
Filed June 21, 1956, Ser. No. 592,899
4 Claims. (Cl. 260—94.9)

This invention relates to a process for recovering monomer from a solution of materials comprising monomer, solvent, and polymer. In another aspect this invention relates to a method of recovering unreacted polymerizable materials from the effluent stream of a polymerization reactor. In still another aspect this invention relates to an efficient polymerization process wherein unreacted polymerizable materials are recycled to the reaction with a greatly reduced power requirement. In one of its more specific aspects this invention relates to a process for recovering and reusing unreacted ethylene in a polymerization process.

In many polymerization reactions there are sufficient unreacted polymerizable materials leaving the reaction zone in the product stream that considerable effort to recover and reuse these materials is justified. This is particularly true in the polymerization of normally gaseous olefin monomer. In such reactions it is quite common to dissolve a monomer in solvent and conduct a polymerization in the presence of a catalyst at elevated temperatures and pressures. The effluent stream, containing monomer, solvent, and polymer, and possibly catalyst, is generally flashed at a greatly reduced pressure in order to vaporize the normally gaseous monomer from the product solution. Immediate removal of this monomer is desirable so that increased pressure is not required to maintain the reactor effluent in a liquid phase. In addition, when suspended catalyst is present in the effluent stream, this monomer will tend to form polymer which, because of varying conditions, has physical properties different from the reactor product.

Flashing the monomer from the reactor effluent by reducing the pressure to a low value is an operable method of removing monomer; however, such a process necessitates a considerable expenditure of energy in order to recompress the vaporized monomer to the polymerization pressure for recycle to the process. An additional problem is presented since flashing the monomer in this manner can result in localized cooling within the solution with resulting precipitation of polymer in the flashing chamber. In many cases it is desirable to maintain the polymer in solution until subsequent purification steps have been completed.

I have discovered a highly efficient method of recovering monomer from a polymerization reactor effluent in such a manner that the monomer can be recycled to the polymerization reactor at a considerable savings in equipment costs, maintenance, and power requirement. Broadly, my invention is the recovery of monomer from a solution by flashing monomer vapors from the solution in a series of steps at progressively reduced pressures so that a large amount of monomer is vaporized at comparatively high pressures, thus reducing the power requirement for recompression. Since only a portion of the monomer is removed in each stage, the heat requirement for any one stage is reduced, thus minimizing the chance for precipitation of polymer from solution. In another embodiment of my invention the over-all requirement of the process is reduced still further by condensing solvent which is vaporized in the flashing stages and recycling this solvent to the polymerization process after saturating said solvent with recovered monomer. This embodiment presents further advantages for the many polymerization reactions which are exothermic, since the heat of solution of the monomer in the solvent can thereby be removed prior to introducing the monomer solution to the reaction vessel.

Figure 2:
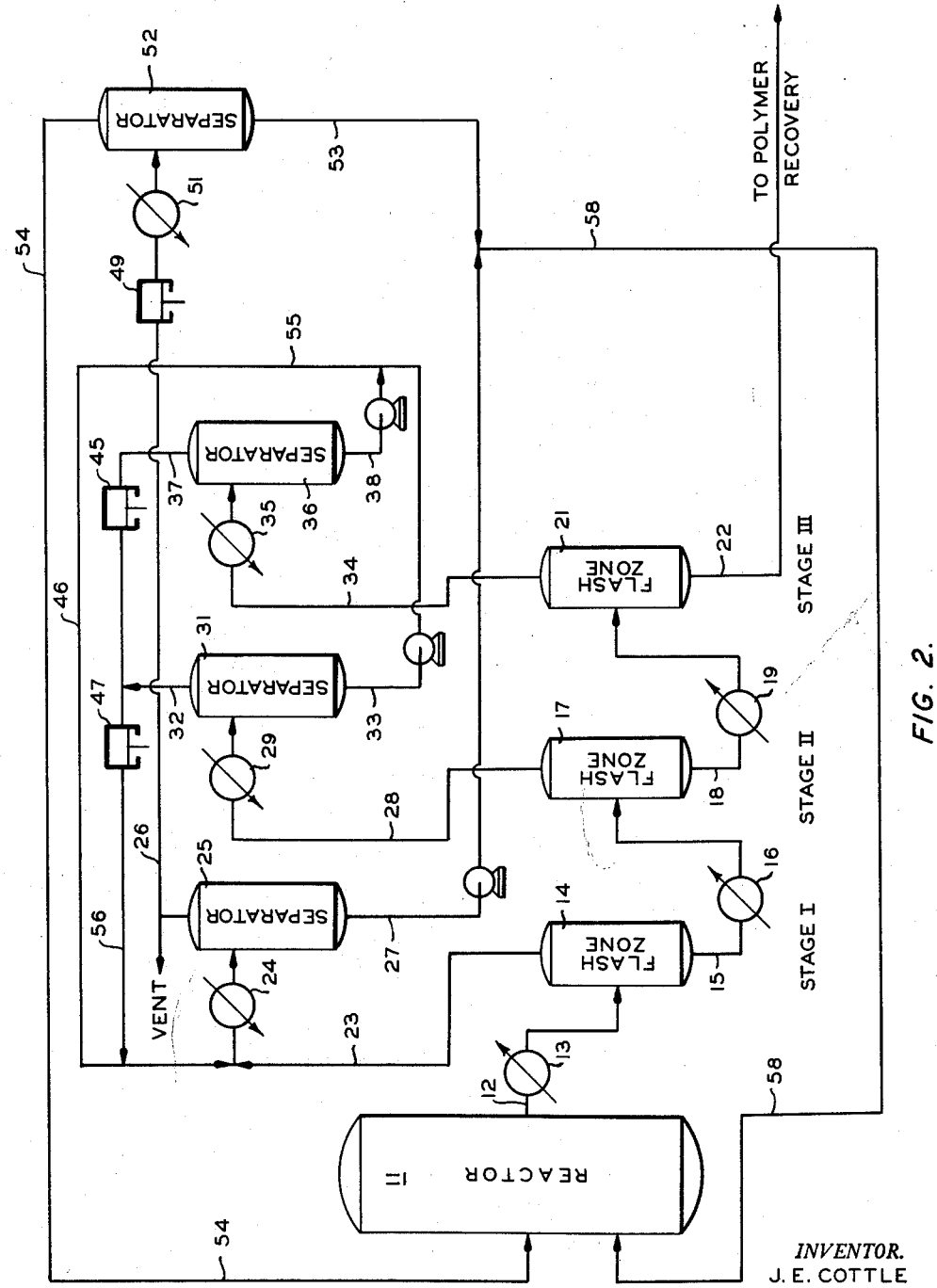

It is an object of this invention to provide a method whereby monomer can be recovered and reused in a polymerization reaction with a minimum power requirement. It is another object of this invention to provide a method for removing monomer from a solution comprising monomer, solvent, and polymer in such a manner that polymer is not caused to precipitate from solution. It is still another object of this invention to provide a process for polymerizing ethylene in which solvent and unreacted ethylene are recycled to the reaction zone in such a manner that the power requirement for recompressing ethylene to the polymerization pressure is reduced, that polyethylene is not prematurely precipitated from solution, and that the problem of heat removal from the polymerization reactor is reduced. Other objects, advantages and features of the present invention will become apparent to those skilled in the art from the accompanying description and drawings in which:

FIGURE 1 is a schematic flow diagram showing one embodiment of my invention, and FIGURE 2 illustrates another embodiment of my invention wherein solvent is saturated with monomer prior to recirculation to the polymerization zone.

While my invention can be broadly applied to the recovery of monomer from any polymerization reaction which utilizes a solvent and a normally gaseous or highly volatile monomer and elevated polymerization pressures, it is of particular advantage in the polymerization and copolymerization of polymerizable olefins, especially aliphatic and cyclic olefins, preferably 1-olefins including both mono and diolefins, for example, butadiene and the like. Among the examples of the preferred class of products of these polymerization reactions are homopolymers of ethylene, propylene, 1-butene, 1-pentene, and the like, and copolymers of ethylene with propylene, 1-butene, or butadiene, and the like. In a preferred embodiment of this invention, aliphatic 1-olefins with a maximum of eight carbon atoms per molecule and no branching nearer the double bond than the four-position are polymerized in the presence of a catalyst comprising chromium, a portion of which is hexavalent (preferably at least 0.1 percent by weight of the total catalyst), as chromium oxide associated with at least one oxide from the group consisting of silica, alumina, thoria, and zirconia. The total chromium content is preferably between 0.1 and 10 weight percent. Polymerization is ordinarily carried out at a temperature between 150 and 450° F. The pressure of the reaction can vary over a wide range, ordinarily from atmospheric up to 1000 pounds per square inch absolute or higher. In processes employing a diluent the lower pressure limit is that necessary to maintain the diluent in a liquid phase. While the reaction can be conducted in a gaseous phase, my invention deals with those applications in which solvent is used and the pressure in such cases is generally in the range of 100 to 800 pounds per square inch absolute. The olefin is usually polymerized in a solvent which is liquid and inert under contacting conditions, preferably a hydrocarbon solvent such as naphthenic hydrocarbons and paraffinic hydrocarbons of from three to twelve carbon atoms, for example, isooctane and cyclohexane. The effluent withdrawn from the reactor comprises a solution of polymer and unreacted monomer in solvent; and when slurry or suspended catalyst is used, the solution also contains catalyst.

Monomer is removed from the reactor effluent solution by flashing the solution in two or more stages at progressively reduced pressures. Throughout the steps it is necessary to maintain the temperature of the solution sufficiently high so that polymer does not precipitate from the solution. (For example, in the polymerization of ethylene with a cyclohexane solvent as described above, the reactor effluent contains about 6–8 weight percent polyethylene and the solution temperature, or cloud point temperature, is in the range of 170 to 200° F. During the steps in which ethylene is flashed from this solution, the temperature should be maintained substantially above the solution temperature, and it is preferred that the approximate temperature of the polymerization reaction be maintained throughout the monomer removal steps.) The pressures utilized in each flashing stage and the number of stages used in the process depend upon the reaction pressure and the vapor pressures at the approximate reaction temperature of the particular monomer and solvent being used. Generally, a two-stage flashing will enable the realization of most of the advantages of my invention; although adaptations can readily be made which employ three or more flashing steps. For purposes of clarity on this point, the accompanying schematic diagrams of FIGURES 1 and 2 shows embodiments of this invention which utilize three flashing stages.

As the reactor effluent liquid stream is flashed in the series of stages at progressively reduced pressures, a vapor stream comprising monomer and solvent is formed for each flashing zone used in the process. Since it is desirable to evaporate as little solvent as possible, the pressure of the final stage should be above the vapor pressure of the solvent at the flashing temperatures. The pressures in the other flashing zones will be intermediate the reactor pressure and the pressure of the final stage. To further reduce recompression requirements, each vapor stream from the several flashing zones is cooled to condense solvent which is then separated from the remaining vapor streams. This solvent, thus separated, can be further stripped of monomer vapors and gaseous impurities or recycled directly to the polymerization reactor; but, the disposition of solvent is not an important feature of my invention except in the embodiment in which this solvent is saturated with monomer vapors at the highest flashing pressure and recycled to the polymerization reactor. The monomer vapors which have been separated from the solvent are compressed, preferably in stage-wise compression, to the original polymerization pressure and recycled to the reaction zone.

A more complete understanding of my invention can be realized by reference to the accompanying drawings which illustrate schematically two embodiments thereof. Referring now to FIGURE 1, the polymerization reaction takes place in reactor 11 which is equipped with suitable feed inlets not shown. In reactor 11, a volatile or normally gaseous monomer is polymerized in solution in the presence of a suitable catalyst under polymerization conditions of temperature and pressure. The reactor effluent, which comprises polymer, solvent, and monomer, is withdrawn from the reactor through conduit 12 and passes through heat exchanger 13 where it is heated sufficiently to maintain the required temperature under the flashing conditions of zone 14 to which the effluent stream then passes. Under conditions of reduced pressure in zone 14, monomer and solvent are flashed into vapor and the liquid stream passes on through conduit 15 and heat exchanger 16 into flash zone 17 where the process is repeated under conditions of still lower pressure. For three-stage flashing, the liquid stream passes on through conduit 18, is heated in exchanger 19 and flashed again in zone 21 where the pressure is maintained below that of zone 17 but above the vapor pressure of the solvent. Since solvent is evaporated along with the monomer, thereby increasing the polymer concentration in solution, it may be necessary to add additional solvent to flash zones 17 and 21 in order to maintain the desired polymer concentration. The polymer solution leaves the process through conduit 22 and passes on to subsquent recovery steps.

Monomer and solvent vapors leave flash zone 14 through conduit 23 and are cooled in heat exchanger 24, thereby condensing solvent which is separated from the remaining vapors in separator 25, thus forming a vapor stream which is predominantly monomer leaving through conduit 26 and a liquid stream which is predominantly solvent leaving through conduit 27. Likewise, monomer and solvent vapors flashed in zone 17 are carried by conduit 28 through condenser 29 to separator 31 from which separate monomer and solvent streams leave through conduits 32 and 33, respectively. In like manner, vapors from flash zone 21 travel through conduit 34, and cooler 35, to separator 36, and monomer vapors leave through conduit 37 and solvent liquid through conduit 38. The several liquid solvent streams, thus formed, are combined in conduit 39 and passed to stripping zone 41 wherein gaseous impurities are removed and vented through conduit 42 and monomer vapors are stripped and removed through conduit 43. Stripping zone 41 contains suitable vapor-liquid contacting devices of any type well known in the art as well as suitable reboiling means, such as internal coils. Solvent leaves the stripping zone through conduit 44 and can be recycled to reactor 11 or passed to storage or further solvent treatment steps. In another embodiment of my invention, the stripping zone is eliminated and the combined solvent stream in conduit 39 is passed directly to the reactor, or to other processing.

The monomer vapor streams, which, as they issue from the several separators, are at a variety of pressures each slightly below those pressures employed in the respective flashing zones, are recompressed to the polymerization pressure, preferably by stage-wise compression. Accordingly, monomer vapors in conduit 37 at the lowest operating pressure are compressed by compressor 45 to the pressure of the monomer vapors in conduit 32, and are combined therewith in line 46. These vapors, thus combined, are compressed from the intermediate pressure of separator 31 to the pressure of the monomer vapors in conduit 26, and are conveyed thereto through conduit 48. When stripping zone 41 is used, monomer vapors in line 43 are combined with the vapors in conduit 26. The total combined monomer stream is then compressed in compressor 49 to a pressure slightly above the polymerization pressure, and after residual solvent is condensed in cooler 51, separated in separator 52 and removed through conduit 53, the monomer vapors are recycled to the polymerization zone through conduit 54. Residual solvent in conduit 53 can be fed to stripping zone 41 or disposed of in any desired manner.

Still another embodiment of my invention, which has special advantages in operations where the solvent flashed in the monomer removal steps need not be purified prior to being reused in polymerization reactions, is illustrated in FIGURE 2. In this embodiment most of the elements of the process remain the same as described in connection with FIGURE 1, and corresponding numbers used to indicate these features in FIGURE 1 are used in FIGURE 2. In this embodiment the solvent streams from separators 31 and 36 are conveyed by lines 33 and 38, respectively, and combined in line 55. It should be noted that this combined solvent stream, unlike the embodiment of FIGURE 1, does not include the solvent stream issuing from the stage one separator 25. Rather, the combined solvent streams of conduit 55 pass to separator 25 by joining the vapors in conduit 23 and passing through condenser 24. This combined solvent stream is also joined by the combined vapor streams in conduit 56, having been compressed to the pressure of separator 25. By thus directing the monomer and solvent streams from separators 31 and 36, the solvent stream issuing from separator 25 includes all solvent vaporized in the monomer recovery process, and this solvent is saturated with monomer at the highest flash pressure. In this manner, considerable monomer can be recycled to the polymerization zone by pumping in a liquid stream rather than by the considerably more expensive method of compressing vapors to the polymerization pressure. The remaining monomer vapors which are not dissolved in the solvent are compressed and recycled as described in relation to the embodiment of FIGURE 1.

A preferred application of this invention is in the monomer recovery of an ethylene polymerization process employing a cyclohexane solvent and a chromium oxide-silica-alumina catalyst. In such a polymerization the temperature and pressure are ordinarily in the ranges of 150 to 450° F. and 300 to 700 pounds per square inch absolute. The reactor effluent comprises cyclohexane, polyethylene and unreacted ethylene which is recovered according to my invention by flashing in several stages, preferably two or three. For example, in all flashing stages the temperature is maintained approximately in the range of 250 to 310° F. When two flashing stages are used, the first stage can be operated in the range of 150 to 350 pounds per square inch absolute but below the reaction pressure and the second stage operated at a still lower pressure in the range of 50 to 250 pounds per square inch absolute. If three flashing stages are used the pressure of the first stage can remain in about the same range and the second stage operated in the range of 70 to 250 pounds per square inch, but lower than the first stage. The third stage would then be operated at a pressure still lower than the second stage in the range of 40 to 100 pounds per square inch absolute. At all of these pressures and temperatures cyclohexane will be flashed with the ethylene and separation is effected by cooling the flashed vapors to a temperature in the range of 80 to 125° F., thus condensing most of the cyclohexane. These temperature and pressure ranges, which are applicable to an ethylene-cyclohexane system, are presented for purposes of illustration and should not be interpreted as limiting my invention.

It should be understood that several modifications in the embodiments of my invention as detailed in the accompanying drawings can be made without departing from the scope of my invention. For example, additional cooling and vapor separating steps can be added between the various compression steps, thereby reducing the horsepower requirement of each compressor. Also the effluent stream of two or more reactors can be processed in one series of flashing stages. The various monomer and solvent streams which are shown being recycled to the polymerization reactor can be directed to other areas for further treatment or storage for future use; or a portion of each recycled stream can be diverted to purification steps to prevent the buildup of impurities within the process. In this regard an alumina bed is sometimes used in the recycle monomer stream to remove small quantities of water or other catalyst poisons that would otherwise tend to build up in the system.

By way of illustration the following examples and material balances are presented to further describe and clarify my invention.

EXAMPLES

Example I

Ethylene is polymerized in a cyclohexane solvent in the presence of a chromium oxide-silica-alumina catalyst at a pressure of 500 pounds per square inch absolute and a temperature of 285° F. A residence time of four hours in the reactor is employed. The reactor effluent contains about 4 to 8 weight percent polyethylene, about 80 to 90 weight percent cyclohexane, and about 4 to 6 weight percent ethylene with minute quantities of methane, ethane, and carbon dioxide. Less than 1 weight percent suspended catalyst is also present.

The reactor effluent is maintained at about 285° F. throughout the ethylene recovery steps and additional cyclohexane is added during the process to keep the polyethylene concentration relatively constant as cyclohexane is flashed with the ethylene.

The effluent stream is flashed in three stages (as illustrated in FIGURE 1 of the drawings) and ethylene vapors recovered are compressed and recycled to the reactor.

A material balance and operating conditions are shown in Table I.

Example II

A process similar to the one described in Example I is carried out except that the combined solvent stream from the separators is recycled to the reactor without passing through the stripping column. An ethylene material balance for this operation is also shown in Table I.

Example III

In this example the polymerization and ethylene flashing steps are as described in Example I. Vapors and liquid from separating zones for stages II and III are passed to the separator for stage I, as shown in FIGURE 2. As a result, solvent recycled to the reactor is saturated with ethylene at the higher pressure of the stage I separator (280 pounds per square inch absolute) and the load on the third stage compressor (49, FIG. 2) is greatly reduced. Also the heat of solution of the ethylene in the cyclohexane is dissipated outside the reactor and alleviates the heat removal problem within the reactor. Table I shows an ethylene material balance for this example.

TABLE I

| | Ethylene Material Balance (Pounds per Minute) | | | Operating Variables | |
|---|---|---|---|---|---|
| | Example I | Example II | Example III | Pressure (p.s.i.a.) | Temperature (° F.) |
| | Figure 1 Operation | | Figure 2 Operation | | |
| | With Stripping Col. | Without Stripping Col. | | | |
| Reactor Effluent | 1,198 | 1,197 | 1,199 | 500 | 285 |
| Flash Zones: | | | | | |
| Stage I— | | | | | |
| Vapor | 750 | 605 | 618 | 290 | 285 |
| Liquid | 448 | 592 | 581 | | |
| Stage II— | | | | | |
| Vapor | 361 | 504 | 499 | 100 | 285 |
| Liquid | 87 | 88 | 82 | | |
| Stage III— | | | | | |
| Vapor | 82 | 82 | 82 | 50 | 260 |
| Liquid | 5 | 6 | 0 | | |
| Separators: | | | | | |
| Stage I— | | | | | |
| Input | 750 | 605 | 1,199 | | |
| Vapor | 610 | 544 | 395 | 280 | 100 |
| Liquid | 140 | 61 | 804 | | |
| Stage II— | | | | | |
| Input | 361 | 504 | 499 | | |
| Vapor | 241 | 439 | 436 | 90 | 100 |
| Liquid | 120 | 65 | 63 | | |
| Stage III— | | | | | |
| Input | 82 | 82 | 82 | | |
| Vapor | 32 | 31 | 32 | 40 | 100 |
| Liquid | 50 | 51 | 50 | | |
| Stripping Column: | | | | | |
| Input | 310 | | | | |
| Vapor | 309 | | | 280 | 100 |
| Liquid | 1 | | | | |
| Recycle: | | | | | |
| Vapor | 1,192 | 1,014 | 395 | | |
| Liquid | 1 | 177 | 804 | | |

Among the several advantages of this invention are the savings in monomer recompression power requirement. These savings for Examples II and III over single stage flashing for monomer separation are shown in Table II.

TABLE II

| Compression Stages (Pounds per Square Inch Absolute) | RECOMPRESSION POWER REQUIREMENTS | | |
|---|---|---|---|
| | Single Stage Flash (Pounds Ethylene per Minute) | Three Stage Flash | |
| | | Example II (Pounds Ethylene per Minute) | Example III (Pounds Ethylene per Minute) |
| 40 to 90 | 1,014 | 31 | 32 |
| 90 to 280 | 1,014 | 470 | 468 |
| 280 to 510 | 1,014 | 1,014 | 395 |
| Horsepower | 3,740 | 1,660 | 1,058 |

As shown by the above examples, the process of this invention yields several advantages over a monomer recovery by single stage flash. In addition to enabling better heat control to avoid precipitation of polymer in the flashing equipment, the process as described reduces considerably the initial equipment costs and operating expense. The amount of solvent vaporized with the monomer is minimized by multiple stage flashing, thereby reducing condenser load. Also, as shown in Table II above, the compressor sizes and operating horsepower requirements for the multiple stage flash system are much lower than that required for single stage flash. The further improvement in this respect in the embodiment of FIGURE 2 is also well illustrated in Table II, Example III.

I claim:

1. In a polymerization process employing an elevated reaction pressure and yielding a reactor effluent comprising solid granular catalyst suspended in liquid containing normally solid polymer and normally gaseous monomer dissolved in a suitable inert liquid solvent, the improved method of monomer recovery for reuse in said polymerization process which comprises passing said effluent to a first flashing zone at a temperature above the solution temperature of said polymer in said solvent and a pressure below said reaction pressure thereby flashing monomer and some solvent from said effluent; removing vapors of monomer and solvent from said first flashing zone thus forming a first vapor stream at said first zone pressure; passing the remaining liquid effluent from said first zone to a second flashing zone at a temperature above the solution temperature of said polymer in said solvent and a pressure below said first zone pressure but above the vapor pressure of said solvent at said second zone temperature, thereby flashing additional monomer and some solvent from said effluent; removing vapors of monomer and solvent from said second flashing zone thus forming a second vapor stream at said second zone pressure; condensing and separating solvent from said second vapor stream; combining said solvent thus separated with said first vapor stream; compressing monomer from said second vapor stream to the pressure of said first vapor stream; combining said monomer thus compressed with said first vapor stream at said first zone pressure to form a combined process stream; condensing solvent evaporated in said first flashing zone and separating solvent evaporated in said first and second flashing zones from said combined process stream at said first zone pressure thereby forming a solvent stream saturated with monomer at said first zone pressure and a combined monomer stream at said first zone pressure; passing said saturated solvent stream to said polymerization process; compressing said combined monomer stream to said reaction pressure; and passing said combined monomer stream thus compressed to said polymerization process.

2. In a polymerization process employing an elevated reaction pressure and yielding a reactor effluent containing normally solid polymer and normally gaseous monomer dissolved in an inert liquid solvent, the improved method of monomer recovery for reuse in said polymerization process which comprises flashing said effluent at a temperature above the solution temperature of said polymer in said solvent and a first pressure below said reaction pressure thereby forming first vapors containing monomer and solvent and first liquid containing polymer, monomer and solvent, flashing said first liquid at a temperature above the solution temperature of the polymer in the solvent and a second pressure below said first pressure thereby forming second vapors containing monomer and solvent and second liquid containing polymer and solvent, cooling said second vapors to condense solvent thereby forming third vapors containing monomer and third liquid containing solvent, combining said third liquid with said first vapors at substantially said first pressure and cooling the mixture to condense more solvent, separating said mixture into a recycle vapor monomer stream and a recycle liquid solvent stream saturated with monomer dissolved in said solvent at substantially said first pressure, recycling liquid solvent thus saturated to the polymerization process, compressing said third vapors to substantially said first pressure and combining vapors thus compressed with the recycle monomer of said first vapors thus forming a combined monomer stream, compressing monomer from said combined stream to said reaction pressure, and recycling monomer thus compressed to the polymerization process.

3. The process of claim 2 wherein said polymer is polyethylene, said monomer is ethylene, and said solvent is cyclohexane, the polymerization process employs a temperature of 150 to 450° F. and a pressure of 300 to 700 pounds per square inch absolute, said effluent is first flashed at a temperature in the range of 250 to 310° F. and said first pressure is from 150 to 350 pounds per square inch absolute, and said first liquid is flashed at a temperature in the range of 250 to 310° F. and said second pressure is in the range of 50 to 250 pounds per square inch absolute.

4. The process of claim 2 wherein said polymer is polyethylene, said monomer is ethylene, and said solvent is cyclohexane, said polymerization process employs a temperature of 150 to 450° F. and a pressure of 300 to 700 pounds per square inch absolute, said effluent is flashed at a temperature in the range of 250 to 310° F. and said first pressure is in the range of 150 to 350 pounds per square inch absolute, said first liquid is flashed at a temperature in the range of 250 to 310° F. and said second pressure is in the range of 70 to 250 pounds per square inch absolute, and said second liquid is flashed at a temperature in the range of 250 to 310° F. and at a third pressure in the range of 40 to 100 pounds per square inch absolute, thus forming additional vapors which are cooled to form an additional monomer stream and an additional liquid solvent stream, said additional monomer stream being compressed to said second pressure and combined with said third vapors and said additional solvent stream is combined with said third liquid.

References Cited in the file of this patent

UNITED STATES PATENTS

| 2,396,791 | Krase et al. | Mar. 19, 1946 |
| 2,545,144 | Green et al. | Mar. 13, 1951 |
| 2,691,647 | Field et al. | Oct. 12, 1954 |